INVENTOR.
Miles A. McLennan
BY
Barnes, Kisselle, Laughlin & Raisch
Attorneys

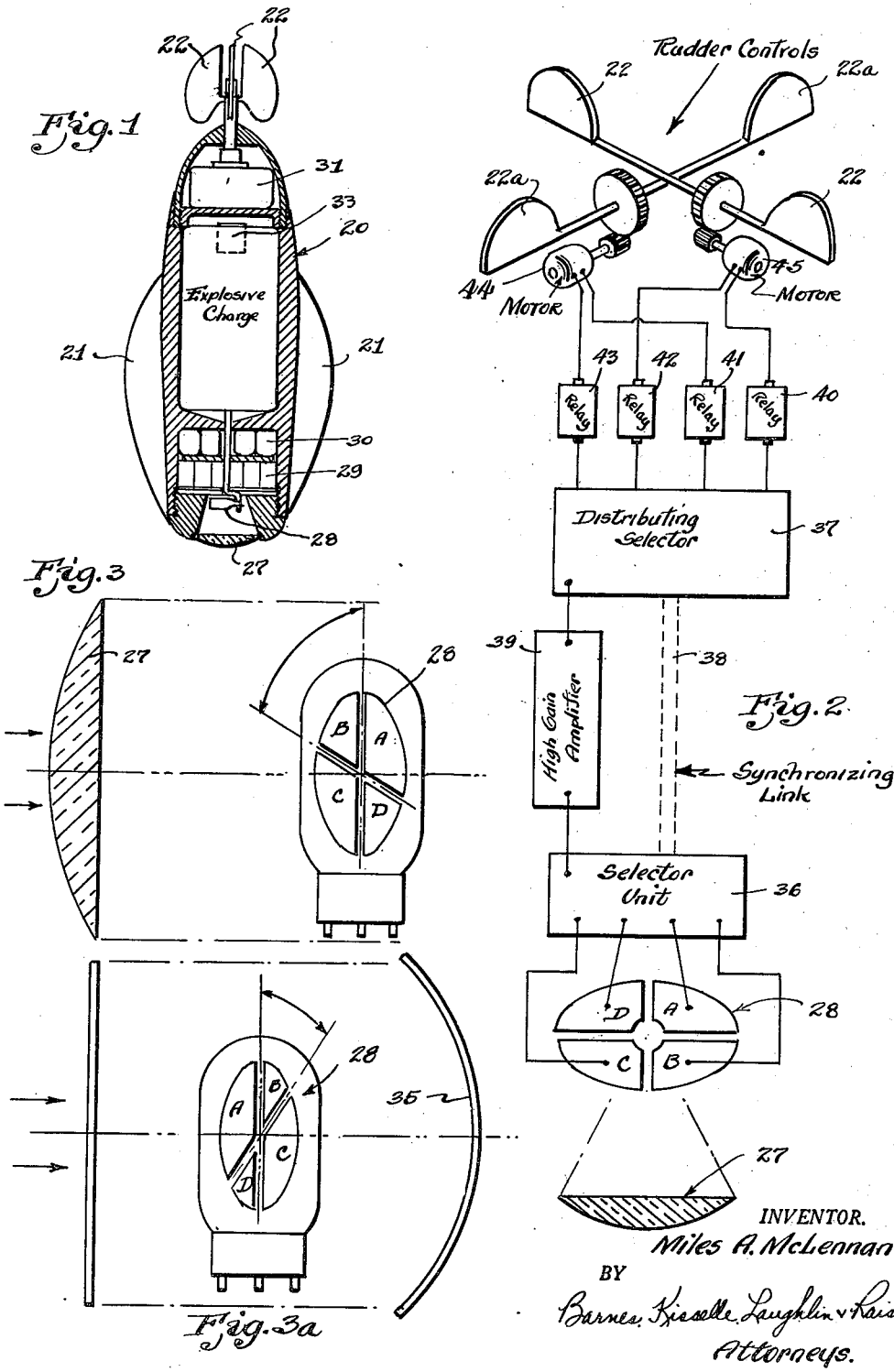

July 2, 1946.                M. A. McLENNAN                2,403,387
            RADIANT ENERGY RESPONSIVE DIRECTIONAL CONTROL
                    Filed Dec. 19, 1942         4 Sheets-Sheet 3
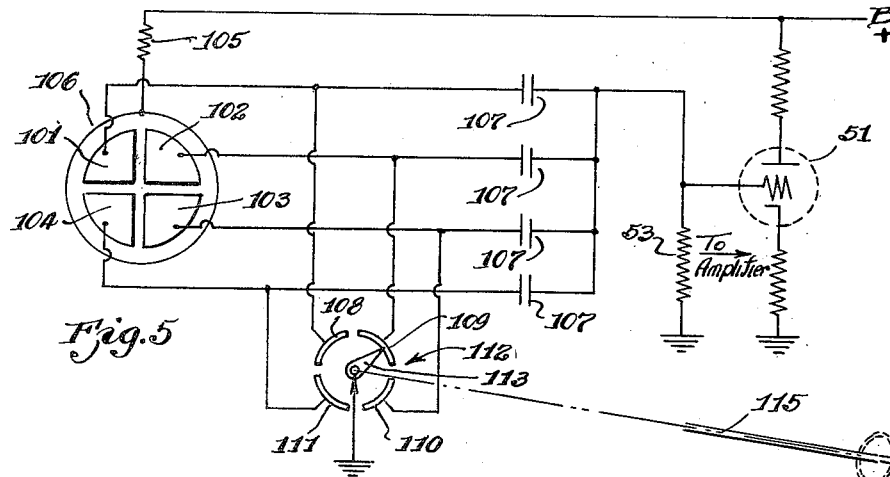
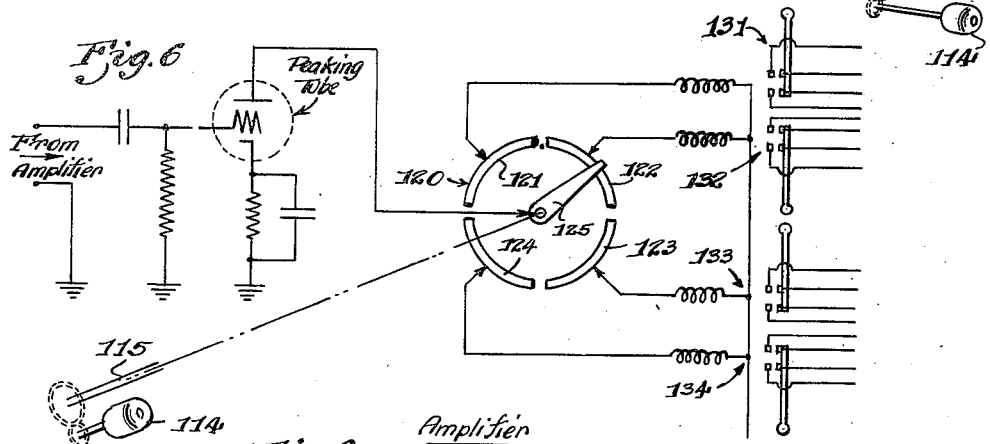
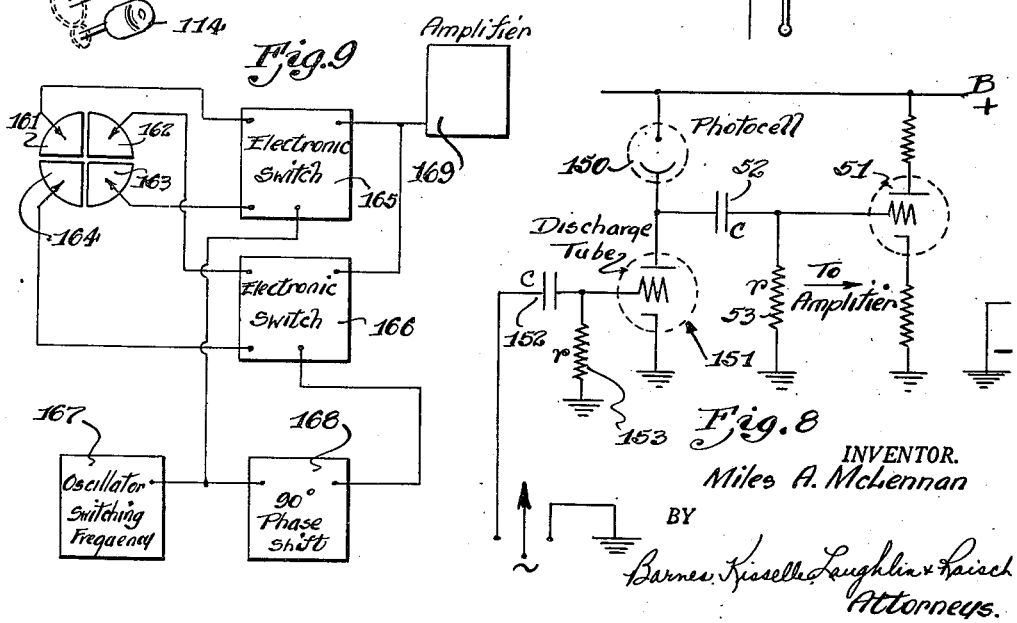
INVENTOR.
Miles A. McLennan
BY
Barnes, Kisselle, Laughlin & Raisch
Attorneys.

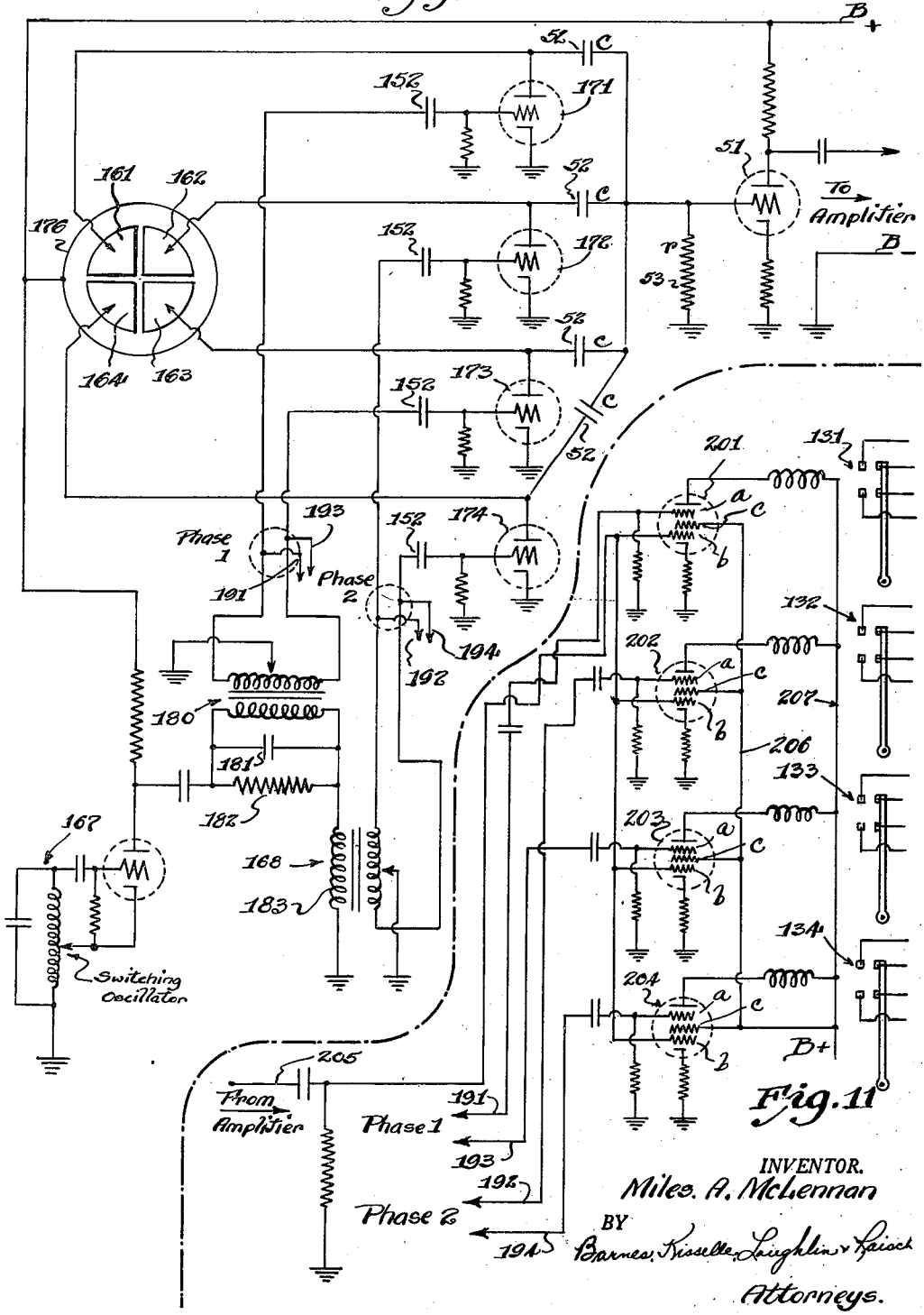

Patented July 2, 1946

2,403,387

UNITED STATES PATENT OFFICE 2,403,387

RADIANT ENERGY RESPONSIVE DIRECTIONAL CONTROL

Miles A. McLennan, Detroit, Mich.

Application December 19, 1942, Serial No. 469,511

10 Claims. (Cl. 250—41.5)

This invention relates to a radiant energy responsive directional control.

More particularly the invention constitutes an improvement over my copending application Serial No. 433,925 filed March 9, 1942, on an improved radiation directional indicating and guiding device.

An object of this invention is the provision of radiant energy pickup with an amplifier and recorder or response mechanism with a minimum of moving parts or complete elimination of mechanically moving parts in the pick up and distribution system.

A further object is the provision of an automatic control device which, in response to radiant energy impulses, will direct a moving object toward the source of energy. For example, bombs or other destructive devices may be released with self-propelling mechanisms or gravity impelled, with the present directional device embodied therein to carry the device to its target. The source of energy may be a ship at sea or an airplane or it may be the heat from an industrial plant and so on. Many variations are possible on the basic principle.

Basically the system may constitute a quadrant photo cell of the conductive or emissive type with a device, such as a lens or reflector, for concentrating the radiant energy on the cell. An amplifier transmits the impulse or signal thus derived to a control system which utilizes the signal as an indication of direction or as a directional control for an object moving toward the source. Synchronizing means, mechanical or electrical, are interposed between the quadrant cell and the control system to cause proper relation of signal received. The cost of the control system would be negligible in comparison to the cost of the bomb or torpedo.

Other objects and features of the invention having to do with principles of operation and details of construction, such as various pick-ups and relaying controls and the synchronizing systems will be set forth in the following description and claims.

In the drawings:

Fig. 1 illustrates a general plan of an aerial torpedo having the directional control of the present invention.

Fig. 2 is an outline of the main elements of the circuit shown diagrammatically.

Fig. 3 illustrates a lens pick-up for the quadrant photo-cell.

Fig. 3a illustrates a reflector pick-up.

Fig. 5 illustrates the head-end or pick-up end of a circuit using mechanical switching or synchronizing.

Fig. 6 illustrates the distributing or control end corresponding to Fig. 12.

Fig. 8 shows a modified vacuum discharge circuit for use in a storage type of unit.

Fig. 9 illustrates a modified head-end selector using a quadrant photo-cell and electronic switching.

Fig. 10 is a detailed head-end circuit utilizing a circuit as shown in Fig. 8.

Fig. 11 is a detailed distributing circuit corresponding to the head-end circuit of Fig. 10.

Figure 7:
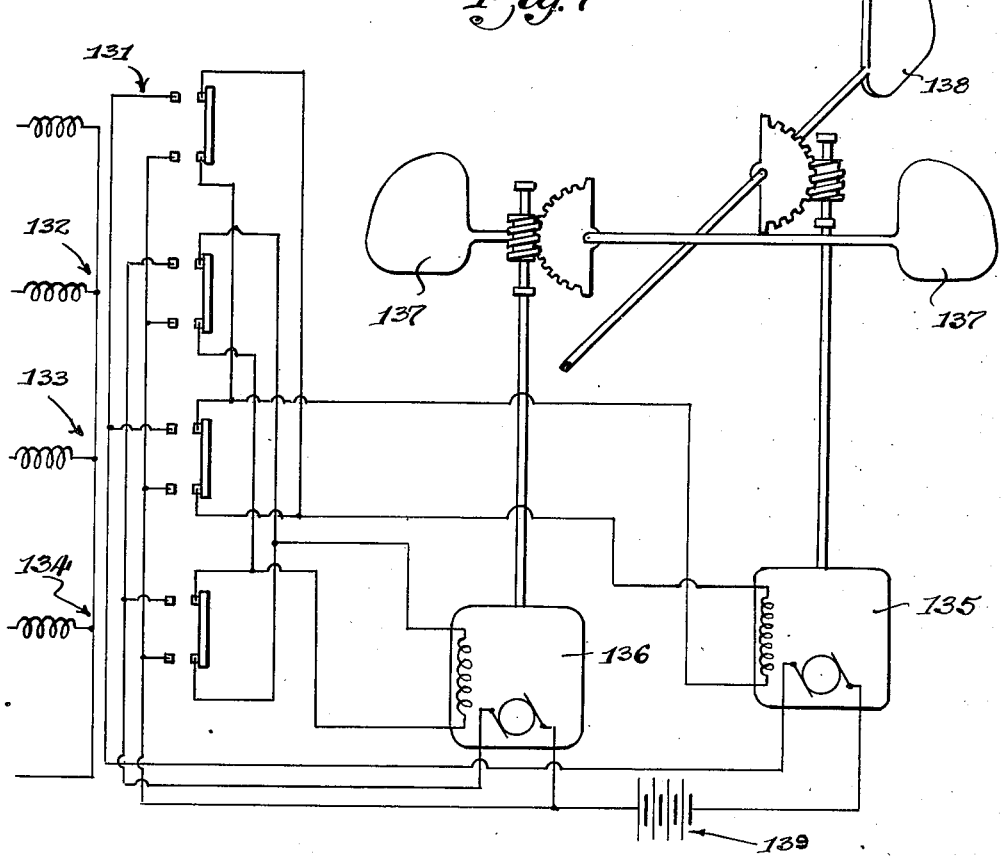
Fig. 7 illustrates diagrammatically a corrective robot control mechanism to cooperate with the circuits.

Referring to the drawings, in Figure 1, an aerial torpedo casing is shown at 20 with forevanes 21 arranged thereon. At the rear or tail end are mounted four guiding rudders 22. A condensing lens 27 is mounted directly at the nose of the housing. At the focal point of the lens is a photo-cell 28 having a quadrant pick-up element. The electrical control system is built in at the space indicated 29, with batteries at 30. These are connected to a rudder control mechanism 31 shown at the tail end. A detonator is pictured diagrammatically at 33.

In Figure 3 the diagrammatic relation of the quadrant photo-cell 28 with respect to the lens 27 is shown. The quadrants are lettered A, B, C, and D. In Figure 3a the quadrant photo-cell 28 is shown at the focal point of a parabolic or spherical reflector 35. The arrows show the direction of the light source or other source of radiant energy.

In Figure 2 the main elements of the system are shown in diagrammatic presentation in order that the system as a whole may be understood. The lens 27 directs light to the quadrants of photo-cell 28. Each quadrant is connected to a selector unit 36 which will be described later. From the selector unit there are two connections to a distributing selector 37. One connection is a synchronizing link 38 which may be with a mechanical synchronizer or electric synchronizer as will be described. The second connection is a high-gain amplifier 39. Relays 40, 41, 42 and 43 are connected respectively to reversible motors 44 and 45. These motors in turn are connected to rudders 22 and 22a.

Before going into the details of the circuits, the basic operation of the unit will be described. Assuming that the torpedo 20 is dropped from an airplane toward a source of light the lens will pick up the light and direct it to one of the sensitized quadrants of the photo-cell 28. If the torpedo is heading directly for the light the lens would direct the light rays directly to the center of the photo-cell and there would then be no actuation of the rudder controls. However, any tendency for the flight to vary from its target would throw a spot of light on one of the quadrants. This would send an impulse to the selector unit and this impulse would be amplified and transmitted to the distributing selector. From there it would go to one of the relays to actuate one pair of rudders to correct the flight so that the light rays again fall at the center of the quadrant photo-cell. The synchronizing link insures that the impulse caused by light on any one quadrant will be directed to the proper relay. The rudders, of course, would be formed in sufficient size to adequately guide the missile. If desired, self-impowering means may also be built into the torpedo so that it could have automatic flight in any direction toward a source of radiant energy. This device could be used against objectives having high visual contrast, for example, fires previously started by incendiary bombing.

In daytime ships at sea might form the source of radiant energy in contrast to the surrounding ocean and particularly with the use of auxiliary filters to increase the contrast. If suffiicent sensitivity can be obtained the infra-red or heat rays might be used to direct the torpedo. By changing the relations between the pick-up and the distributions system, operation may be changed from centering upon a bright object against a dark background; to center upon a dark object against a light background.

Figure 4:
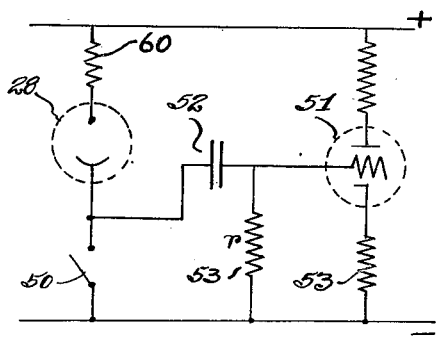
Fig. 4 illustrates a circuit arrangement for use with photo-emissive cells with storage feature.

In Figure 4 a circuit arrangement for a photo-emissive type of photo-cell is shown. The circuit represents only a single quadrant of the cell. For example, the photo tube is shown at 28 connected to positive and negative terinals with a discharge switch 50. Amplifier tube 51 amplifies the net potential appearing across resistor 53. A condenser 52 and a resistance 53 are inserted respectively between the light sensitive element of tube 28 and the grid of tube 51, and between the grid and the cathode of tube 51. 69 is a limiting resistor.

Referring now to Figure 5, there is shown the pick-up or head-end of a circuit. The four quadrants of the photo-cell are shown at 102, 101, 103 and 104 respectively. Other multiples of the light-sensitive members may be used as desired for any particular installation. The limiting resistance 105 leads in to a collector ring 106. See Figure 5. Each quadrant is connected respectively to a condenser 107 and then to the grid of amplifier tube 51. Resistor 53 goes to the amplifier. Each quadrant is also connected respectively to quarter rings 108, 109, 110, 111, respectively, of a commutator 112. A negatively connected arm or switch member 113 is driven by a motor 114 through a shaft 115. This corresponds to the discharge switch 50 of Figure 4.

In the operation of this head end, any light exposures on the quadrants will cause storage of electricity in the condensers and the discharge caused by movement of switch 113 will cause flow of current and consequently voltage drop in resistor 53. This voltage will be amplified at 39, Figure 2, in a manner well-known and will come into the distributing circuit shown in Figure 6. Another commutator 120 is shown here with quarter rings 121, 122, 123, 124. A switching arm 125 is driven also by shaft 115. Each quarter ring 121, 122, 123, 124 is connected to a relay 131, 132, 133, and 134. A peaking tube in Figure 6 is provided to cause the plate or operating current to occur in a quarter of a cycle or less to insure suitable periodical signal location. In other words to avoid running over from one cycle to another.

When a current of signal shows on a quadrant of the head-end photo-cell it is transmitted instantly through the amplifier to commutator 120. Switch arm 125 is in a position to transmit the signal further to the necessary control relay to move the one pair of rudder arms in a direction to correct for the deviation indicated by the photo-cell signal.

Thus each deviation of the projectile is recorded in a suitable correction movement in the directing or guiding means. Other types of charging circuits than that shown in Figure 4 may be used and also some types of discharging circuits.

In Figure 7 is shown a possible rudder control to be used with the system just described. Relays 131 and 133 are connected to a reversible motor 135. Relays 132 and 134 are connected to a reversible motor 136. Motor 135 drives rudders 137 and motor 136 drives rudders 138. A battery 139 furnishes the necessary energy for the motors. The elementary motor circuit is shown but will not be described in detail.

The preivously described device is what may be referred to as a mechanical switching unit since the synchronizing shaft 15 is mechanically driven. We take up next a circuit which utilizes electronic switching and thus avoids all moving parts except in the final control end.

In Figure 8 is shown a vacuum tube 151 in a discharge circuit for use in a storage type pick-up circuit. The circuit is comparable to that shown in Figure 4 except that in place of a mechanical switch there is provided a discharge tube 151. Associated with the tube 151 is a condenser 152 and a grid leak 153. A discharge impulse or wave is impressed on condenser 152 every quarter cycle. This discharges condenser 52 through the large impulse applied to the grid of the discharge tube 151. The condenser 152 and the grid lead 153 provide a self-bias and "peaking" of the discharge pulse, as it is desired that this impulse take less than one-quarter of an operational cycle when used with a quadrant photo-cell.

In Figure 9 the circuit for the head-end is indicated generally in a block diagram. It includes a quadrant photo-cell having quadrants 161, 162, 163, 164. Quadrants 161 and 163 are connected to an electronic switch 165 while quadrants 162 and 164 are connected to an electronic switch 166. An oscillator 167 is provided to furnish the switching frequency to switch 165 and a 90° phase shifter 168 is provided to furnish a different phase current to switch 166. An amplifier 169 serves as before to amplify the signals reaching the distributor or control end of the circuit. This method of switching results in an electrical equivalent of the mechanical commutation switching previously described.

In Figure 10 is a more detailed presentation of the head-end circuit embodying electronic switching. The quadrants are numbered as in Figure 9, each being connected respectively, to the plate of discharge tubes 171, 172, 173, 174 and then through condensers to the grid of tube 51 and the amplifier. The collector element of the photo-cell is shown diagrammatically at 176. The switching oscillator frequency is not critical. It may be set at frequency from 20 to 1000 cycles or higher. The point in the circuit indicated phase 1 is connected to the grids of tubes 171 and 173. Coil 180 and condenser 181 are proportioned to resonate at switching frequency. The resistance 182 and the reactance of winding 183 are proportioned to have approximately equal impedance at switching frequency so that the point of the circuit indicated at phase 2 is shifted 90° in the phase from phase 1.

The grid of amplifier tube 51 is connected to the plate of each tube 171 to 174 and consequently impulses of voltage appearing across resistance 53 through any of the tubes 171 to 174 are sent to tube 51 as part of the amplifier.

In Figure 11 is shown the distributing circuit for electronic switching; at the point indicated phase 1 are leads 191 and 193 taken from phase 1 of Figure 10. At the point indicated phase 2 are leads 192 and 194 taken from phase 2 of Figure 10. These leads are connected to grids $a$ of multiple grid tubes 201, 202, 203 and 204 as shown. Grid $a$ is adjacent the plate in each tube. Line 205 coming from the amplifier is connected to grid $b$ adjacent the filament in each tube. Grid $a$ may be called the control grid while grid $b$ may be called the signal grid. Screen grids $c$ are each connected to a common line 206 which connects to a line 207 leading to relays 131, 132, 133 and 134 previously referred to in Figures 6 and 7. The coils of each relay are connected to the plate of the respective tube controlling the relay.

With the above circuit shown in Figures 10 and 11, signals at the photo-cell head-end of a device find response in a correcting control at the distributing end.

Currents are periodically passed to the grid $a$ of tubes 171 and 173 in one phase and tubes 172 and 174 in another phase in 90° relation. If any light signal has been impressed on the sensitive elements 161 to 164 of the quadrant photocell a charge will be stored in the condenser 52 connected to the sensitive element. The impulses of the oscillator will cause a voltage pulse across 53 and a resultant charge will be passed to the grid and thence to the plate of tube 51 as part of the amplifier. The amplifier or speaker as it may be called sends the current impulses to the grids $b$ of tubes 201 to 204. If a signal is impressed on element 161, it will reach grid $b$ of tube 201 at the same time that a quarterly impulse from line 191 reaches grid $a$ of tube 201. This is due to the fact that the discharge pulse of tube 171 is simultaneous with the voltage charge in line 191. This will cause a current to pass to relay 131 to institute a correctional movement of rudder 138. Similarly all the other individual currents operate to produce 4 way control. When a signal is impressed on any element of the pick-up it is transmitted from the amplifier to grids $b$ of each tube 201 to 204. However, it is effective only in that tube which has a grid $a$ current synchronized with the grid $b$ current and in phase with grid $a$. In other words grid $a$ of tubes 201 and 203 will each be activated simultaneously but one will be positive while the other is negative.

The oscillating current and the phase shifter in this case serve as the synchronizing medium so that a signal on one quadrant is transmitted to the proper connecting relay.

What I claim is:

1. A control mechanism responsive to radiant energy contrast which comprises a photo sensitive device including a plurality of photo sensitive electrodes, means for concentrating radiant energy directly upon said electrodes, a plurality of control elements each to be actuated in response to exposure of one of said electrodes to radiant energy, and selector means connecting said electrodes with said control elements comprising signal circuits and amplifier for transmitting a single amplified signal from any of said surfaces to the control circuit at any one time, and a distributing selector means synchronized with said first mentioned selector means to cause said signal to be relayed to the respective control element identified with the electrode receiving the signal.

2. A control mechanism responsive to radiant energy contrast which comprises a photo sensitive device including a plurality of photo sensitive electrodes, means for concentrating radiant energy directly upon said electrodes, a plurality of control elements each to be actuated in response to exposure of one of said electrodes to radiant energy, and selector means connecting said electrodes with said control elements comprising signal circuits and amplifier for transmitting a single amplified signal from any of said electrodes to the control circuit at any one time, and a switching mechanism synchronized with said selector operably connected to said signal circuits and to each of said control elements to cause circuit impulses on any one of said electrodes to be directed to a respective control element.

3. A control mechanism responsive to radiant energy contrast which comprises a photo sensitive device including a plurality of sensitive electrodes, means for concentrating radiant energy directly upon said electrodes depending on the location of the source of energy relative to the electrodes, a plurality of control elements each to be actuated in response to exposure of one of said electrodes to radiant energy, and means connecting said electrodes with said control elements comprising signal circuits for transmitting a signal from any of said electrodes to the control elements, selector tubes connected to each of said control elements, and a two phase pulsating switching circuit connected respectively to said tube circuit and to said selector tubes to cause impulses on any one of said electrodes to be directed to a respective control element.

4. A control mechanism responsnive to radiant energy contrast which comprises a photo sensitive tube circuit including a plurality of sensitive electrodes, means for concentrating radiant energy directly upon said electrodes depending on the location of the source of energy relative to the electrodes, a plurality of control elements each to be actuated in response to exposure of one of said electrodes to radiant energy, and means connecting said electrodes with said control elements comprising signal circuits for transmitting a signal from any of said electrodes to the control elements, selector tubes connecting to each of said control elements, and an electronic switching circuit connected respectively to said tube circuit and said control elements to cause transmittal of signals on respective sensitive electrode to corresponding control elements.

5. A control mechaninsm responsive to radiant energy contrast which comprises an optical device for picking up and concentrating energy rays, a photo sensitive device including a plurality of sensitized electrodes located in the focus of said optical device, a plurality of control devices, one for each sennsitized electrode, means for amplifying signals caused by light concentration on said electrodes, and means for discharging the energy collected on said electrodes in succession and for causing simultaneous energization of a control device corresponding to the electrode energized to effect a predetermined movement of said control devices depending on the relation of said source of radiant energy to said optical device.

6. A control mechanism responsive to radiant energy contrast which comprises an optical device for picking up and concentrating energy rays, a photo sensitive device including a plurality of sensitized electrodes located in the focus of said optical device, a plurality of control devices, one for each sensitized electrode, means for amplifying signals cause by light concentration on said electrodes, and means for discharging the energy collected on said electrodes in succession and for completing an electrical circuit to each one of said control devices in a timed relation to the energization of each surface to effect a predetermined relative movement of said control devices.

7. A control mechanism responsive to radiant energy contrast which comprises a photo sensitive device with a plurality of photo sensitive electrodes, an energy storage circuit connected to each electrode, a plurality of control devices, one for each electrode, an energizing circuit for each of said control devices, and selector and synchronized distributor means for causing discharge of each storage circuit simultaneously with closing of that energizing circuit by said means.

8. A control mechanism responsive to radiant energy contrast which comprises a photo sensitive device with a plurality of photo sensitive electrodes, an electrical circuit connected to each of said electrodes adapted to be periodically connected to a source of different potential, a series of control devices to be actuated, one for each electrode, a control circuit for each device, and means for closing each of said control circuits with the period connection of each electrode circuit whereby any current flowing in said electrode circuit as a result of radiant energy will be conducted to a respective control circuit to actuate the same.

9. A control mechanism responsive to radiant energy contrast which comprises a photo sensitive device with a plurality of photo sensitive electrodes, an electrical storage circuit connected to each electrode, a plurality of control devices, one for each electrode, an energizing circuit for each of said control devices, means for periodically directing current initiated in said storage circuits to said control circuits to tend to cause energization of the same, means normally blocking such energization of control circuits, and means periodically influencing said last named means in a periodic relation to the discharge of each of said storage circuits to cause operation of a control device simultaneously with exposure of any of said electrodes to radiant energy.

10. A control mechanism responsive to radiant energy contrast which comprises a photo sensitive device with a plurality of photo sensitive electrodes, an electrical circuit connected to each electrode means to cause periodic flow of current in said circuit proportional to degree of exposure of each electrode to radiant energy, a series of control devices to be actuated, one for each electrode, a control circuit for each device, means to cause energization of said control circuits at periodic intervals, means for blocking said energization of control circuits, and means periodically influencing said last named means in a periodic relation to the current flow in said electrode circuits, to cause operation of a control device simultaneously with exposure of any of said electrodes to radiant energy.

MILES A. McLENNAN.